UNITED STATES PATENT OFFICE.

OTTO LIEBKNECHT, OF FRANKFORT-ON-THE-MAIN, GERMANY.

PROCESS OF PRODUCING HYDROGEN PEROXID.

1,262,589. Specification of Letters Patent. Patented Apr. 9, 1918.

No Drawing. Application filed January 3, 1918. Serial No. 210,214.

*To all whom it may concern:*

Be it known that I, OTTO LIEBKNECHT, a subject of the German Emperor, and resident of Frankfort-on-the-Main, Germany, have invented certain new and useful Improvements in Processes of Producing Hydrogen Peroxid, of which the following is a specification.

My invention relates to the production of hydrogen peroxid, and has for its object to provide a process for obtaining directly a concentrated hydrogen peroxid solution containing upward of 10 per cent. of hydrogen peroxid. I attain this object by allowing a sulfuric acid containing not essentially less than 180 grams per liter to act upon a perborate such as sodium, or other alkali-metal, perborate. The reaction yields directly a highly concentrated hydrogen peroxid solution.

When producing hydrogen peroxid in accordance with the well known process by a chemical reaction between the peroxids of the light metals, particularly the peroxids of barium and sodium, and mineral acids, preferably sulfuric acid, it is not possible to obtain directly a more or less concentrated solution of hydrogen peroxid, because of the fact that either the chemical treatment of the peroxid, especially of barium peroxid, with concentrated sulfuric acid was itself accompanied with difficulties, or because the great quantity of salts that separate such, for instance, as sodium sulfate, when treating sodium peroxid with sulfuric acid, rendered the requisite stirring of the mass very difficult or prohibited such entirely when a strong concentration was aimed at. In one operation it was but possible to obtain a solution containing about 10 per cent. of hydrogen peroxid. To produce a commercial product of 20 to 30 per cent. of hydrogen peroxid, it was imperative either to obtain the desired result in more than one operation by adding a portion of peroxid to the acid, separating the produced precipitations and repeating this step several times; or to concentrate by distillation the dilute hydrogen peroxid obtained in one operation. With the chemical treatment of perborates with mineral acids which, *per se*, is well known, it was to be expected that the same drawbacks would become manifest when more or less concentrated acids are applied, while, moreover, the formation of considerable quantities of a readily soluble perboric acid had to be feared, which were apt to remain in solution and for that reason become lost.

I have discovered that contrary to what ought to be expected it is possible to chemically change sodium perborate by means of concentrated sulfuric acid in one operation, resulting in a high yield of a solution containing 20 per cent. and more of hydrogen peroxid. The mechanical treatment of the mass which is absolutely necessary to carry the reaction right through, offers no difficulties in spite of the fact that considerable quantities of sodium sulfate and boric acid separate. The boric acid is apparently able to remove or diminish friction among the sodium sulfate crystals, thus producing favorable conditions for a more easy mechanical treatment of the mass. The resulting yield of hydrogen peroxid closely approaches the theoretical yield, which goes to prove that no disturbing by-reactions and decompositions occur. Furthermore, it became manifest that of the quantity of boric acid formed but from 10 per cent. to 15 per cent. dissolved.

This fact which could not be foreseen has an important bearing on the economy of the process since the separating boric acid can readily be worked up to borate which may be converted into perborate and reused in the production of hydrogen peroxid. Since the reaction consumes but one half as much acid per molecule of hydrogen peroxid as is consumed by a peroxid, and since but small quantities of heat are released during the reaction, the direct production of hydrogen peroxid from perborate offers technical and economical advantages in this relation also. The solutions obtained by my novel process are directly applicable for any industrial purposes.

In carrying the process into effect, I may, for instance, proceed as follows. To 230 kilograms of dilute sulfuric acid, containing 380 grams of sulfuric acid per liter, 200 kilograms of sodium perborate are added while the acid solution is being stirred. I prefer to proportion the quantity of sulfuric acid used so that at the end a slightly acid reaction prevails. On completion of the reaction and after the mass has cooled down, the produced hydrogen peroxid may be separated by a washing treatment. The resulting solution contains about 23.5 per cent. of hydrogen peroxid. The more dilute washing water portions are used up when starting for a new production.

In the place of sulfuric acid, I may employ other acids, such, for instance, as hydrochloric acid, or phosphoric acid, of a corresponding concentration.

I have further discovered that like results can be obtained by proceeding in a different manner, viz. by allowing the concentrated acid to act upon a suspension of sodium perborate in water. The unexpected effect is obtained, then, that no decomposition of the alkaline hydrogen peroxid solutions occurs. When working along this line, the yield is the same as with the above described mode of working. To give a practical example, I may suspend 110 kilograms of sodium perborate in 130 liters of water. While continually stirring the aqueous solution thus obtained, I gradually add 73 kilograms of sulfuric acid containing 1162 grams of sulfuric acid per liter of the liquid. If after having added a portion of the sulfuric acid and the suspension has turned more liquid, I add another 40 kilograms of sodium perborate and thereupon the remaining portion of sulfuric acid. On completion of the reaction and after the mass has cooled down, I separate the hydrogen peroxid from the precipitated salts preferably by means of a filtering operation. If desired the solution may be slightly acidulated toward the close of the reaction; the further procedure, then, is the same as afore described.

The latter mode of carrying the invention into effect offers the advantage that any undesirable manipulation of strong acids which readily corrode the containers used is avoided; this advantage becomes especially apparent when working with even more concentrated acids for the production of stronger solutions of hydrogen peroxid. A further advantage of the second described method of procedure constitutes the fact that no decomposition whatever of the alkaline hydrogen peroxid solutions occurs.

From the well known processes of producing hydrogen peroxid by decomposing persulfates by means of strong sulfuric acid, my novel process is principally distinguished by the fact that I obtain a hydrogen peroxid solution of the desired degree of saturation directly without any subsequent heating or distillation; while with the first named processes hydrogen peroxid is not produced at the first step, but must be liberated through an action of distillation.

What I claim as my invention and desire to secure by Letters Patent of the United States of America, is:—

1. A process of producing hydrogen peroxid, consisting in allowing a perborate and a mineral acid to act upon each other, and proportioning the said perborate so as to directly obtain a highly concentrated solution of hydrogen peroxid.

2. A process of producing hydrogen peroxid, consisting in allowing an alkali metal perborate and a mineral acid to act upon each other, and proportioning the said alkali-metal perborate so as to obtain directly a solution containing upward of 10 per cent. of hydrogen peroxid.

3. A process of producing hydrogen peroxid, consisting in allowing an alkali-metal perborate and a mineral acid to act upon each other, and proportioning the said mineral acid so as to obtain directly a highly concentrated solution of hydrogen peroxid.

4. A process of producing hydrogen peroxid, consisting in allowing an alkali-metal perborate and a mineral acid to act upon each other, and proportioning the said mineral acid so as to obtain directly a solution containing upward of 20 per cent. of hydrogen peroxid.

5. A process of producing hydrogen peroxid, consisting in allowing sodium perborate and a mineral acid to act upon each other, and proportioning the said sodium perborate as well as the said mineral acid so as to obtain directly a highly concentrated solution of hydrogen peroxid.

6. A process of producing hydrogen peroxid, consisting in allowing sodium perborate and a mineral acid to act upon each other, and proportioning the said sodium perborate as well as the said mineral acid so as to obtain in one operation a solution containing upward of 10 per cent. of hydrogen peroxid.

7. A process of producing hydrogen peroxid, consisting in gradually adding a concentrated mineral acid to a suspension of perborate, whereby a concentrated solution of hydrogen peroxid is obtained in one operation.

8. A process of producing hydrogen peroxid, consisting in gradually adding a concentrated mineral acid to a suspension of perborate, whereby a concentrated solution containing upward of 10 per cent. of hydrogen peroxid is obtained in one operation.

In testimony whereof I have signed my name to this specification in the presence of two subscribing witnesses.

OTTO LIEBKNECHT.

Witnesses:
 WILHELM STÖTZER,
 ALMA LANCK.